United States Patent [19]

Matsuyama et al.

[11] Patent Number: 5,313,042
[45] Date of Patent: May 17, 1994

[54] LASER HARDENING DEVICE

[75] Inventors: Hidenobu Matsuyama; Kimihiro Shibata, both of Yokosuka; Hiroki Sakamoto, Yokohama, all of Japan

[73] Assignee: Nissan Motor Co., Ltd, Japan

[21] Appl. No.: 892,886

[22] Filed: Jun. 3, 1992

[30] Foreign Application Priority Data

Jun. 7, 1991 [JP] Japan ................ 3-136515
Jun. 13, 1991 [JP] Japan ................ 3-142042
Jun. 18, 1991 [JP] Japan ................ 3-146131
Jun. 20, 1991 [JP] Japan ................ 3-148800

[51] Int. Cl.$^5$ .................... B23K 26/00
[52] U.S. Cl. .................... 219/121.6; 219/121.74
[58] Field of Search ........... 219/121.6, 121.85, 121.61, 219/121.74

[56] References Cited

U.S. PATENT DOCUMENTS 5,180,448  1/1993  Hyde et al. ............ 219/121.61 X
5,196,672  3/1993  Matsuyama et al. ...... 219/121.83

FOREIGN PATENT DOCUMENTS 4-28487  1/1992  Japan .
4-28488  1/1992  Japan .

*Primary Examiner*—C. L. Albritton
*Attorney, Agent, or Firm*—Lowe, Price, LeBlanc & Becker

[57] ABSTRACT

A laser hardening device for forming a hardened layer on the surface of an object irradiated by a laser beam is so arranged as to emit a laser beam which is linearly polarized in the incidence plane containing the normal to the surface and the optic axis of the laser beam irradiating the surface. The device comprises a first concave mirror for condensing the laser beam the incidence plane, and a second concave mirror for condensing the laser beam in a perpendicular plane to the incidence plane, the first concave mirror being disposed closer than the second concave mirror to the laser oscillator in the path of the laser beam. Laser beam is therefore absorbed at a high absorption rate by the object, and a hardened layer is formed without coating a laser absorption agent onto the object. The incidence angle of the laser is preferably no less than 60 degrees, and by arranging that the laser beam is parallel on the irradiated surface, a uniform, hardened layer is obtained. Moreover, by blowing shield gas on the irradiated surface from a gas nozzle provided with a smoothing mechanism such as metal mesh, oxidation of the hardened layer or surface melting due to oxidation is prevented and a more desirable hardened surface is obtained.

8 Claims, 4 Drawing Sheets

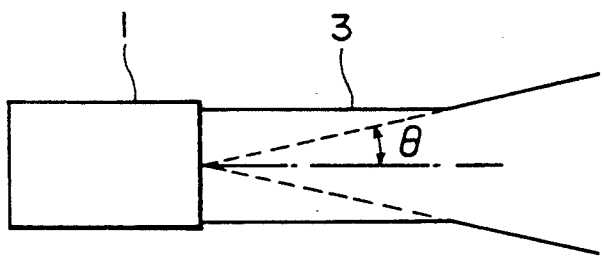
F I G. 2
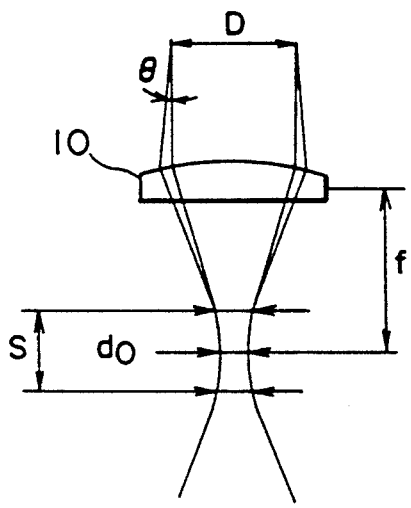
F I G. 3
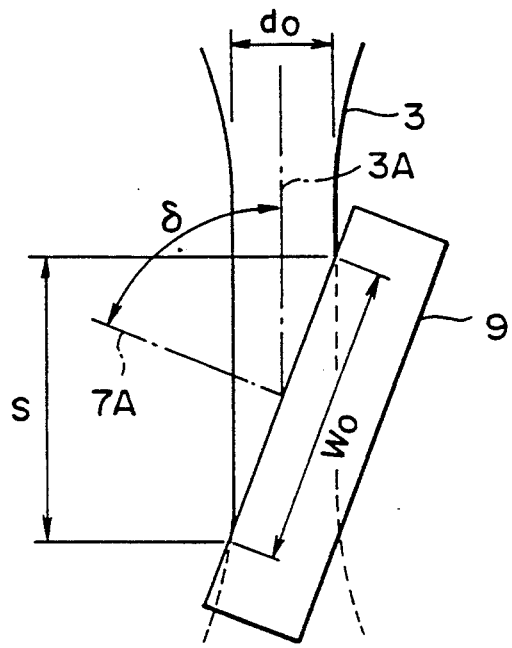
F I G. 4

LASER HARDENING DEVICE

FIELD OF THE INVENTION

This invention relates to a laser hardening device for irradiating and hardening the surface of a metal object.

BACKGROUND OF THE INVENTION

Devices which perform hardening using a laser beam generally comprise an optical mechanism consisting of a laser oscillator, reflecting mirror and condensing lens, and shield gas supply system for excluding oxygen from the irradiated points.

Before an object to be hardened is irradiated by a laser beam, the surface of the object is coated with a laser absorbing agent to increase the laser absorption of the object and form a uniform hardened layer on the object. After irradiation, the coating is removed.

The laser is generally a $CO_2$ laser, and the laser absorption agent may or example comprise the components in the Table 4.1 "$CO_2$ absorption coating material table" on page 77 of "Laser Kakou Gijutsu" written by Hiromichi Kawasumi (Nikkan Kogyo Shinbunsha, 28 Jan., 1985).

If parts subject to hydraulic pressure, e.g. parts for automatic transmissions in automobiles, are to be hardened, it is desirable that oxide films or other impurities are not present on the surface so as to prevent deterioration of oil performance. Laser absorption agents prevent such oxidation of the object surface which would otherwise be caused by the laser irradiation.

Laser absorption agents therefore have a desirable effect on the formation of a hardened layer, but their application and removal require much effort which increases the cost of hardening.

SUMMARY OF THE INVENTION

An object of this invention is therefore to increase the laser absorption of an object without using a laser absorption agent.

A further object of this invention is to render the depth of a hardened layer on an object uniform without using a laser absorption agent.

Yet another object of this invention is to exclude oxygen more effectively by using shield gas.

In order to achieve the above objects this invention provides a laser hardening device for forming a hardened layer on an object by irradiating a surface of an object having a normal using a laser beam having an optic axis and optic path.

This device comprises an oscillator for emitting a laser beam which is linearly polarized in an incidence plane containing the normal and the optic axis, a first concave mirror for condensing the laser beam in the incidence plane, and a second concave mirror for condensing the laser beam in a perpendicular plane to the incidence plane. The first concave mirror is disposed closer than the second concave mirror to the oscillator in the path of the laser beam.

It is preferable to set the incidence angle of the laser beam on the object surface no less than 60 degrees.

It is also preferable to establish the following conditional relation between the laser oscillator and the first concave mirror.

$$W_0 \cdot \cos \delta \leq 2f\theta + K(D^3/f^2)$$

where, D is the diameter of the laser beam emitted by the laser oscillator, $\theta$ is the dispersion angle of the laser beam, K is the aberration coefficient of the first concave mirror, f is the focal length of the first concave mirror, $\delta$ is the incidence angle of the laser beam, and $W_0$ is the length of the hardened layer formed on the surface of the object by the irradiation of the laser beam, It is also preferable to establish the following conditional relation between the laser oscillator and the first concave mirror.

$$W_0 \cdot \sin \delta \leq 2 \{2f\theta + K(D^3/f^2)\} \cdot f/D$$

It is also preferable that the laser hardening device further comprises a gas nozzle for blowing shield gas towards the surface of the object and a smoothing mechanism for smoothing the flow of the shield gas, e.g. a fine mesh of no less than 50 mesh/inch.

It is also preferable that the gas nozzle comprises a pathway for guiding the laser beam incident on the surface of the object, a shield gas passage surrounding this pathway, and an outlet with an open end substantially parallel to the surface of the object at the end of this pathway.

It is also preferable that the gas nozzle comprises a first gas nozzle disposed between the object and the laser beam incident on the object, and a second gas nozzle disposed between the incident laser beam and the laser beam reflected by the object. In this case, the first gas nozzle has an outlet with an open end which is substantially parallel to the surface of the object and the second gas nozzle has an outlet comprised of a plurality of adjacent cylindrical pieces with open ends. These open ends are substantially parallel to the axis of the incident laser beam between the normal and the incident laser beam and substantially parallel to the axis of the reflected laser beam between the normal and the reflected laser beam.

The Applicant has already submitted applications to the Japanese Patent Office wherein the plane of polarization of the laser beam lies in its plane of incidence (Tokugan Hei 2-132287 and Tokugan Hei 2-132291). Since neither of these applications have been laid open to the public, however, they should not be considered as prior art.

The details as well as other features and advantages of this invention are set forth in the remainder of the specification and are shown in the accompanying drawings.

BRIEF DESCRIPTION OF THE DRAWINGS

FIG. 2 is a schematic diagram showing the dispersion of a laser beam emitted by a laser oscillator.

FIG. 3 is a schematic diagram describing depth of focus when laser beam is converged by a condensing lens.

FIG. 4 is a schematic diagram showing how laser light is incident on the surface of an object.

DESCRIPTION OF THE PREFERRED EMBODIMENTS

Figure 1:
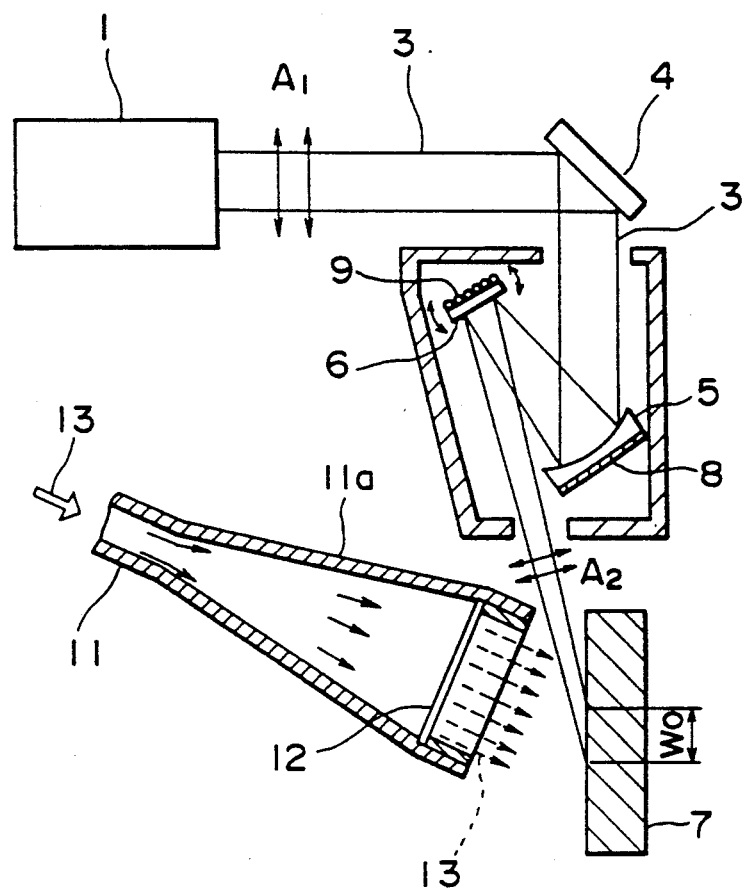
FIG. 1 is a schematic diagram of a laser hardening device according to this invention.

The laser hardening device according to this invention is provided with an optical system comprising a laser oscillator 1, reflecting mirror 4, first concave mirror 5 and second concave mirror 6 as shown in FIG. 1.

The laser oscillator 1 emits a polarized laser beam 3. The laser oscillator 1 comprises a polarizing filter such that the beam 3 is linearly polarized in a plane containing the normal 7A to the surface of an object 7 to be hardened and the optic axis 3A of the laser beam 3 (referred to hereinafter as the incidence plane) as shown in FIG. 4. As a result, the laser beam 3 emitted by the laser oscillator 1 has directional electromagnetic vectors A1, A2 as shown in FIG. 1.

The reflecting mirror 4 is a fixed reflecting mirror which reflects the laser beam 3 emitted by the laser oscillator 1.

The concave mirrors 5 and 6 are supported by mirror holders 8 and 9 such that their angles can be freely adjusted. The concave mirror 5 condenses the laser beam 3 in the incidence plane, while the concave mirror 6 condenses it in a perpendicular plane to the incidence plane. The angle $\delta$ between the normal 7A and the optic axis 3A is no less than 60 degrees.

The laser beam has a very high directionality, but since it is a light beam, there is some beam spread due to diffraction.

Even if the laser beam 3 emitted by the laser oscillator is a plane wave which gives an exactly parallel beam at its emergence point, therefore, it becomes a spherical wave with a given dispersion angle $\theta$ within the Frauenhofer region at a certain distance from the laser oscillator 1. In the case of the $CO_2$ lasers used in laser hardening, this dispersion angle $\theta$ is generally of the order of several mm rad. As shown in FIG. 3, when a laser beam 3 of beam diameter D having a dispersion angle $\theta$ is converged by a condensing lens 10 of focal length f, the spot diameter $d_0$ may from diffraction theory be expressed by the following approximation wherein the aberration coefficient of the condensing lens 10 is K:

$$d_0 = 2f\theta + K(D^3/f^2)d_0 \quad (1)$$

Also as shown in FIG. 4, if the incidence angle of the laser beam 3 is $\delta$ and the length of the hardened surface obtained is $W_0$:

$$W_0 \cdot \cos \delta \leq d_0 \quad (2)$$

From these two equations, we may write:

$$W_0 \cdot \cos \delta \leq 2f\theta + K(D^3/f^2) \quad (3)$$

If the curvature of the convex mirror 5 is set so as to satisfy this condition, therefore, a hardened layer of length $W_0$ or greater can be obtained when the optic axis 3A of the beam 3 coincides with the center of the layer.

If the spot diameter $d_0$ of the laser beam 3 is greater than is necessary, the power density will be insufficient. It is therefore preferable to choose the minimum value of $d_0$ that satisfies the aforesaid conditional equations.

The Inventors set the hardened layer length $W_0=6$ mm, beam diameter $D=25$ mm, dispersion angle $\theta=2$ mm rad, aberration coefficient $K=0.0187$ and incidence angle $\delta$ of laser beam = 75 degrees, performed a calculation according to Equation (6), and thereby obtained a focal length $f > 388$ mm.

Based on this calculation, hardening was performed using a lens of focal length $f=400$ mm, a laser output of 2.0 kw and a beam sweep speed of 2 m/min. Under these conditions, satisfactory hardening was achieved so as to give a hardened layer without any non-uniformity.

The curvature of the concave lens 5 may also be set as follows.

In FIG. 3, as the focal width S is the distance between two points at which the width of the laser beam 3 is $\sqrt{2} d_0$, S is expressed by the following equation (4):

$$S = 2 d_0 \cdot f/D \quad (4)$$

and therefore:

$$W_0 \cdot \sin \delta \leq S \quad (5)$$

or:

$$W_0 \cdot \sin \delta \leq 2 \{2f\theta + K(D^3/f^2)\} \cdot f/D \quad (6)$$

If this condition is satisfied, the laser beam 3 is almost a parallel beam at the surface of the object 7, and the irradiation angle is substantially the same at all irradiated points. The energy density distribution is symmetrical on either side of the plane which involves the optic axis 3A and is perpendicular to the incidence plane of the laser beam 3. There is thus no non-uniformity in the depth of the hardened layer and no partial melting of the hardened layer's surface so that a uniform hardened layer of the required length $W_0$ is formed.

The first concave mirror 5 is disposed closer to the laser oscillator 1 than the second concave mirror 6 in the path of the laser beam 3. This is because as shown by Equation (4), making the value of f larger makes it possible to set a larger value of the focal depth S so that the laser beam 3 becomes more parallel at the incidence point.

The laser hardening device also comprises a gas nozzle 11. The gas nozzle 11 is provided with a nozzle body 11a of which the diameter increases from the inlet to the outlet, and a metal mesh 12 installed crosswise near the outlet for smoothing the gas flow. This metal mesh has a mesh size of finer than 50 mesh/inch.

After shield gas 13a entering from the inlet has passed through the nozzle body 11a, the gas flow is smoothed by passing through the metal mesh 12 to prevent turbulence, and flows as a laminar flow 13b to the surface of the object 7 where it shields from oxygen the positions at which a hardened layer is being formed. By blowing a smoothed flow of shield gas 13b on the object 7, therefore, hardening positions are continually shielded so that atmospheric air and oxygen are not drawn in, and laserworking can be performed without forming a residual oxide film.

For comparison purposes, the Inventors have performed an experimental hardening using the laser beam 3 to irradiate the object 7 made of JIS-S40C low carbon steel under the following conditions: Laser output 2.5 kw, incidence angle=75 degrees, beam dimensions at the surface of the object=6.5×6.5 mm, beam sweep speed=1.5 m/min.

A comparison was made under the aforesaid conditions between the case when $N_2$ gas was supplied at a rate of 30 liters/min from a nozzle 11 having a taper ratio of 0.3, equipped with an outlet with an inner diameter of 30 mm and a metal mesh having a size of 100 mesh/inch being installed at a point 10 mm from the tip of the outlet, and the case when the same volume of $N_2$ gas was supplied from a conventional cylindrical nozzle.

In this experiment, a black oxide deposit was observed at hardening positions on the surface of the object 7 when the conventional cylindrical gas nozzle was used, whereas no oxide or other deposit whatever was found on the surface of the object 7 when the gas nozzle 11 provided with the metal mesh 12 was used.

Figure 5:
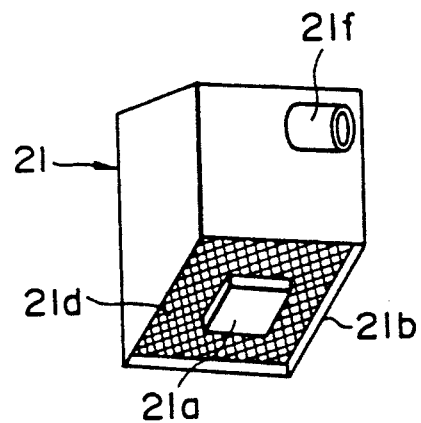
FIG. 5 is a perspective view of another embodiment of a gas nozzle according to this invention.
Figure 6:
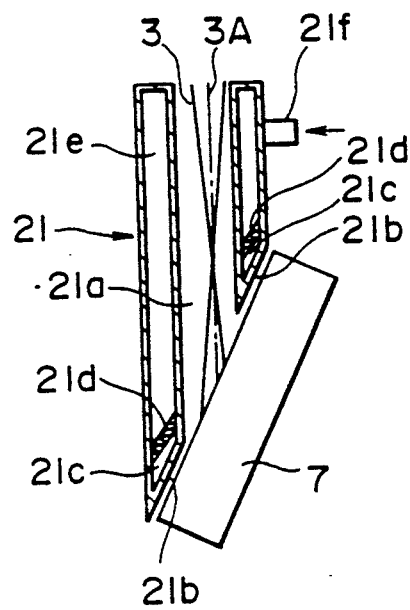
FIG. 6 is a longitudinal view of the gas nozzle shown in FIG. 5.

FIG. 5 and FIG. 6 show another embodiment of this invention relating to the design of the gas nozzle.

A gas nozzle 21 shown in these figures is provided with a pathway 21a of rectangular cross-section for a laser beam 3 surrounded by a gas flow passage 21e. The pathway 21a is formed such that the optic axis 3A of the laser beam 3 lies at its center, and the gas flow passage 21e is formed parallel to the pathway 21a. An outlet 21c having an open end 21b parallel to the surface of an object 7 is formed at the tip of the gas nozzle 21, and a metal mesh 21d for smoothing the gas flow inside crosses the pathway 21a.

A gas supply port 21f for supplying shield gas to the gas flow passage 21e is provided on the outer circumference of the gas nozzle 21.

The Inventors have performed an experimental hardening with regard to this embodiment on an object 7 made of JIS-S40C low carbon steel using a gas nozzle 21 incorporating a 150 mesh/inch stainless steel mesh, $N_2$ gas having a flowrate of 20 liter/min as shield gas, a laser output of 2.0 kw, a beam sweep speed of 2.0 m/min and an incidence angle $\delta$ of 79 degrees. In contrast to the case where shield gas was supplied by a conventional cylindrical nozzle, a uniform hardened layer was obtained without any evidence of partial melting.

Figure 7:
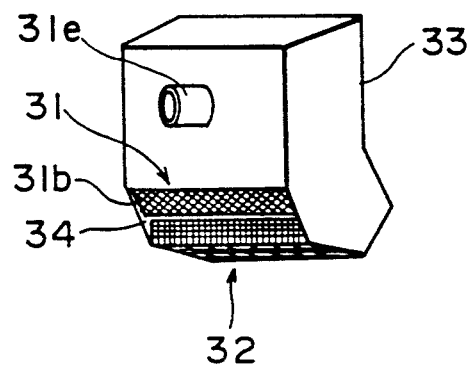
FIG. 7 is a perspective view of yet another embodiment of a gas nozzle according to this invention.
Figure 8:
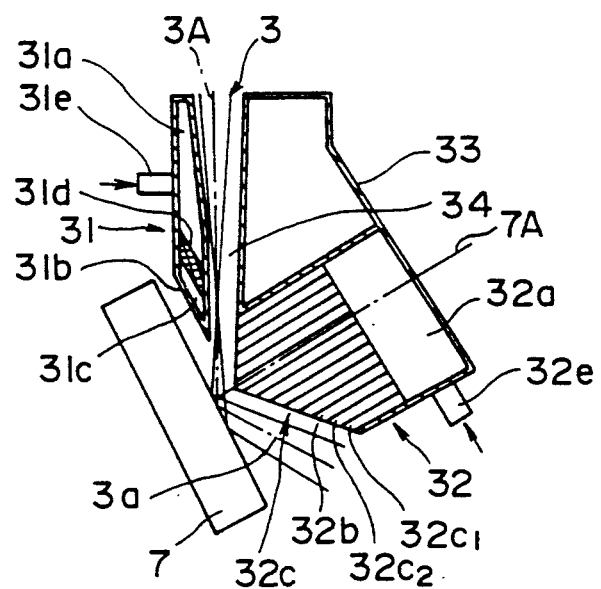
FIG. 8 is a longitudinal view of the gas nozzle shown in FIG. 7.

FIG. 7 and FIG. 8 show yet another embodiment relating to the construction of the gas nozzle. In this embodiment, two gas nozzles 31 and 32 are provided as shown in FIG. 8. The gas nozzle 31 is disposed between the incident beam on the object 7 and the surface of the object 7, while the gas nozzle 32 is disposed between this incident beam and the reflected beam from the surface of the object 7.

The gas nozzle 31 is provided with a gas flow passage 31a, an outlet 31c formed at the end of the gas flow passage 31a, and a supply port 31e for supplying shield gas to the gas flow passage 31. An open end 31b of the outlet 31c is formed parallel to the object 7, and a metal mesh 31d for smoothing gas flow is installed in the outlet 31c at a short distance from the open end 31b.

The gas nozzle 32 comprises a gas flow passage 32a, an outlet 32c connected to the flow passage 32a, and a supply port 32e for supplying shield gas to the gas flow passage 32a.

The outlet 32c is an assembly of adjacent cylindrical pieces $32c_1$, $32c_2$ ... having open ends 32b. The open ends 32b are formed substantially parallel to the axis 3A of the incident laser beam on the object 7 between the incident laser beam and the normal 7A to the surface of the object 7, while they are formed substantially parallel to the axis 3a of the reflected laser beam from the object 7 between the normal 7A and the reflected laser beam.

The gas nozzles 31 and 32 are formed inside a case 33 of one-piece construction as shown in FIG. 7, a pathway 34 for the laser beam 3 passing through the case 33 between the gas nozzles 31 and 32.

According to this construction, shield gas supplied from the supply nozzles 31e and 32e when the laser beam 3 irradiates the surface of the object 7, is blown towards the object 7 by the outlets 31c and 32c. As the gas flow ejected from the outlet 31c is smoothed by the metal mesh 31d, and as the gas ejected from the outlet 32c is smoothed by the cylindrical pieces $32c_1$, $32c_2$ ..., no air mixes with the shield gas so that the parts irradiated by the laser beam 3 are completely shielded from air. Further, as the laser beam 3 does not come into contact with the case 33, there is no risk that the case 33 will be damaged by the laser beam 3.

In regard to this embodiment, the Inventors have performed an experimental hardening with a 150 mesh/inch stainless steel mesh as the metal mesh 31d, and alumina pieces comprising a honeycomb structure as the cylindrical pieces $32c_1$, $32c_2$ ....

In this experiment too, when hardening was performed on the object 7 consisting of JIS-S40C low carbon steel plate using a laser output of 2.0 kw, beam sweep speed of 2.0 m/min and laser beam incidence angle $\delta$ of 79 degrees, a uniform hardened layer without any partial melting was obtained.

The embodiments of this invention in which an exclusive property or privilege is claimed are defined as follows:

1. A laser hardening device for forming a hardened layer on an object by irradiating a surface of an object having a normal using a laser beam having an optic axis and optic path, comprising:
    an oscillator for emitting a laser beam which is linearly polarized in an incidence plane containing said normal and said optic axis,
    a first concave mirror for condensing the laser beam in said incidence plane, and
    a second concave mirror for condensing the laser beam in a perpendicular plane to said incidence plane, wherein said first concave mirror is disposed closer than said second concave mirror to said oscillator in the path of the laser beam.

2. A laser hardening device as defined in claim 1, wherein the incidence angle made by said optic axis of the laser beam incident on said object with respect to said normal is set to no less than 60 degrees.

3. A laser hardening device as defined in claim 1, wherein the following conditional relation exists between said laser oscillator and said first concave mirror:

$$W_0 \cdot \cos \delta \leq 2 f \theta + K(D^3/f^2)$$

where, D is the diameter of the laser beam emitted by said laser oscillator, $\theta$ is the dispersion angle of the laser beam, K is the aberration coefficient of said first concave mirror, f is the focal length of said first concave mirror, $\delta$ is the incidence angle of the laser beam, and $W_0$ is the length of the hardened layer formed on the surface of said object by the irradiation of the laser beam.

4. A laser hardening device as defined in claim 1, wherein the following conditional relation exists between said laser oscillator and said first concave mirror:

$$W_0 \cdot \sin \delta \leq 2 \{2 f \theta + K(D^3/f^2)\} \cdot f/D$$

where, D is the diameter of the laser beam emitted by said laser oscillator, $\theta$ is the dispersion angle of the laser beam, K is the aberration coefficient of said first concave mirror, f is the focal length of said first concave mirror, δ is the incidence angle of the laser beam, and $W_0$ is the length of the hardened layer formed on the surface of said object by the irradiation of the laser beam.

5. A laser hardening device for forming a hardened layer on an object by irradiating a surface of an object having a normal using a laser beam having an optic axis and optic path, comprising:

an oscillator for emitting a laser beam which is linearly polarized in an incidence plane containing said normal and said optic axis, a first concave mirror for condensing the laser beam in said incidence plane, and a second concave mirror for condensing the laser beam in a perpendicular plane to said incidence plane, wherein said first concave mirror is disposed closer than said second concave mirror to said oscillator in the path of the laser beam, a gas nozzle for blowing shield gas towards the surface of said object, and a smoothing mechanism for smoothing the flow of said shield gas.

6. A laser hardening device as defined in claim 5, wherein said smoothing mechanism comprises a line mesh of no less than 50 mesh/inch.

7. A laser hardening device as defined in claim 5, wherein said gas nozzle comprises a pathway for guiding the laser beam incident on the surface of said object, a shield gas passage surrounding this pathway, and an outlet with an open end substantially parallel to the surface of said object at the end of this pathway.

8. A laser hardening device as defined in claim 5, wherein said gas nozzle comprises a first gas nozzle disposed between said object and the laser beam incident on said object, and a second gas nozzle disposed between said incident laser beam and the laser beam reflected by said object, said first gas nozzle having an outlet with an open end which is substantially parallel to the surface of said object, and said second gas nozzle having an outlet comprised of a plurality of adjacent cylindrical pieces with open ends, said open ends being substantially parallel to the axis of said incident laser beam between said normal and said incident laser beam and substantially parallel to the axis of said reflected laser beam between said normal and said reflected laser beam.

* * * * *